United States Patent [19]
Deschamps et al.

[11] Patent Number: 5,628,418
[45] Date of Patent: May 13, 1997

[54] SUSPENDED CEILING FIXTURE MOUNT

[75] Inventors: Bernard F. Deschamps; Henry J. Macuga, both of Ware, Mass.

[73] Assignee: Eclipse Manufacturing, Inc., Ware, Mass.

[21] Appl. No.: 673,367

[22] Filed: Jun. 28, 1996

Related U.S. Application Data

[63] Continuation of Ser. No. 215,024, Mar. 21, 1994, abandoned, which is a continuation-in-part of Ser. No. 995,876, Dec. 23, 1992, abandoned.

[51] Int. Cl.⁶ .................................................. H02G 3/08
[52] U.S. Cl. ........................ 220/3.2; 220/3.9; 248/343
[58] Field of Search .................. 220/3.2, 3.9; 248/343, 248/342, 344, 906

[56] References Cited

U.S. PATENT DOCUMENTS

| | | | |
|---|---|---|---|
| 699,215 | 5/1902 | Müller . | |
| 746,316 | 12/1903 | Ercanbrack . | |
| 855,155 | 5/1907 | Baron . | |
| 862,380 | 8/1907 | Baron . | |
| 929,097 | 7/1909 | Lutz et al. . | |
| 1,207,705 | 12/1916 | Bonnell | 220/3.2 |
| 1,275,725 | 8/1918 | Newton . | |
| 1,688,518 | 10/1928 | Bennett . | |
| 1,810,553 | 6/1931 | Cluny . | |
| 1,843,054 | 1/1932 | Weinstein . | |
| 1,991,160 | 2/1935 | Knight | 247/15 |
| 2,002,491 | 5/1935 | Despard | 247/20 |
| 2,140,861 | 12/1938 | Steketee | 247/22 |
| 2,349,003 | 5/1944 | Renner | 174/54 |
| 2,423,757 | 7/1947 | Dedge | 220/3.9 |
| 2,528,238 | 10/1950 | McDaid | 220/3.8 |
| 2,809,002 | 10/1957 | Rudolph | 248/205 |
| 2,921,114 | 1/1960 | Keen | 174/61 |
| 3,440,331 | 4/1969 | Cohen | 248/343 |
| 3,917,899 | 11/1975 | Oliver | 174/57 |
| 4,023,697 | 5/1977 | Marrero | 220/3.4 |
| 4,050,603 | 9/1977 | Harris et al. | 220/3.9 |
| 4,295,575 | 10/1981 | Flachbarth | 220/3.92 |
| 4,408,696 | 10/1983 | Crosen | 220/3.6 |
| 4,518,141 | 5/1985 | Parkin | 248/546 |
| 4,909,405 | 3/1990 | Kerr, Jr. | 220/3.9 |
| 4,954,032 | 9/1990 | Morales | 411/289 |
| 5,118,237 | 6/1992 | Wright | 411/433 |
| 5,150,868 | 9/1992 | Kaden | 248/343 |

FOREIGN PATENT DOCUMENTS 1475335  3/1967  France .

Primary Examiner—Joseph Moy
Attorney, Agent, or Firm—Reid & Priest L.L.P.

[57] ABSTRACT

An electrical fixture mounting device for hanging an electrical fixture, such as a fan or light, from a suspended ceiling having a criss-cross framework of perpendicular supporting members supported from an overhead support structure. The device includes a box having a closed top, an open bottom, a continuous side wall, and slots in the side wall extending inwardly from the open bottom and configured to engage the supporting members. A wire is fastened at one end to the box and at its other end to the overhead support structure to suspend the box from the overhead support structure.

6 Claims, 2 Drawing Sheets

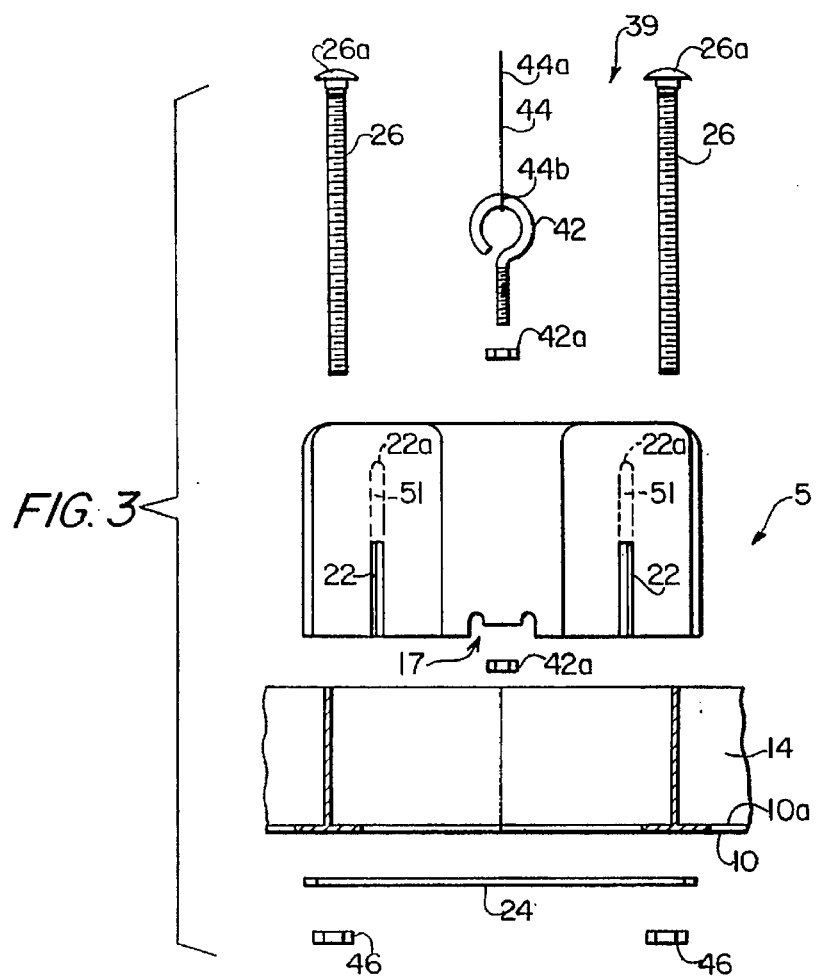
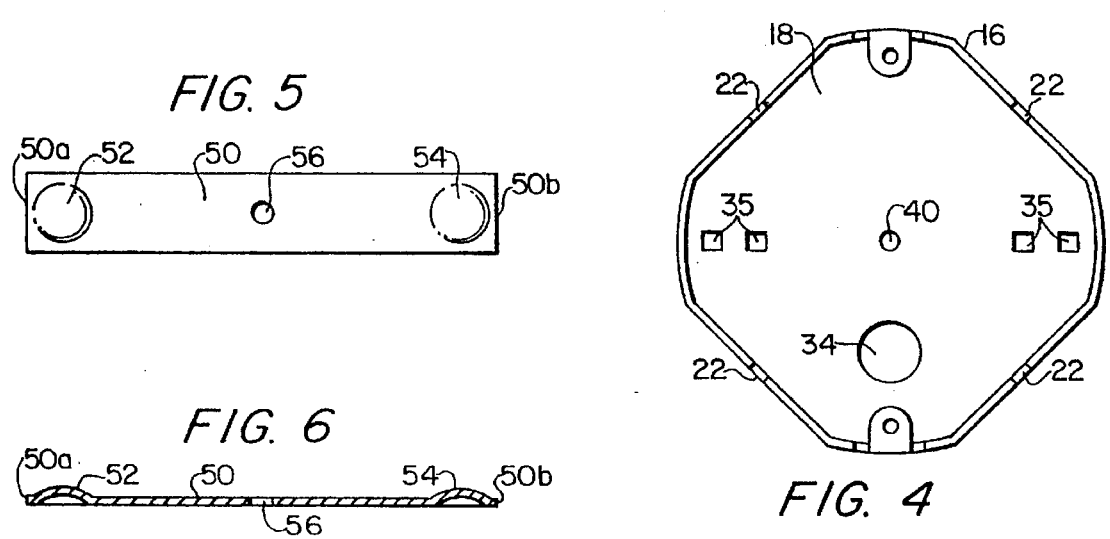

SUSPENDED CEILING FIXTURE MOUNT

This is a continuation of U.S. patent application Ser. No. 08/215,024, filed Mar. 21, 1994, now abandoned, which was a continuation-in-part of application Ser. No. 07/995,876, filed Dec. 23, 1992, now abandoned.

BACKGROUND OF THE INVENTION

Field of the Invention

The present invention relates to a fixture mounting device. More specifically, the invention relates to a fixture mounting device for hanging a fixture from a suspended ceiling.

SUMMARY OF THE INVENTION

The present invention provides a fixture mounting device for hanging a fixture from a suspended ceiling (e.g. a dropped ceiling mainly composed of elongated, spaced-apart, perpendicular supporting members in a criss-cross arrangement supported from an overhead structure, and ceiling tiles supported by the criss-cross supporting members). The inventive fixture mounting device includes a box similar to an electric junction box having a closed top, an open bottom, and a continuous side wall, but is also provided with slots formed in the side wall for engaging the criss-cross supporting members. During use, the box is located at a point of intersection of the criss-cross supporting members with the slots engaging the criss-cross supporting members and the open bottom of the box facing downwardly. The box includes fixture securing means for securing a fixture, such as a fan or light, to the box and suspension means for directly suspending the box from the overhead structure. This forms a very safe arrangement in that if the suspended ceiling collapses, the box and the fixture will remain suspended from the overhead structure. The suspension means may include a heavy wire or the like having a first end connected to the box and a second end connected to the overhead structure. Preferably, the suspension means includes a first eye bolt attached to the overhead structure, a second eye bolt attached to the box top, and a supporting wire, cord, chain, or any other means of sufficient strength to support a fixture threaded through the eyes of the first and second eye bolts so that the box is suspended from the overhead structure by the wire.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 illustrates an exploded elevational view of the device.

FIG. 4 illustrates a bottom plan view of the box top.

FIG. 5 illustrates a top plan view of a strap of the device.

FIG. 6 illustrates an edge view of the strap.

DETAILED DESCRIPTION OF THE PREFERRED EMBODIMENTS

Figure 1:
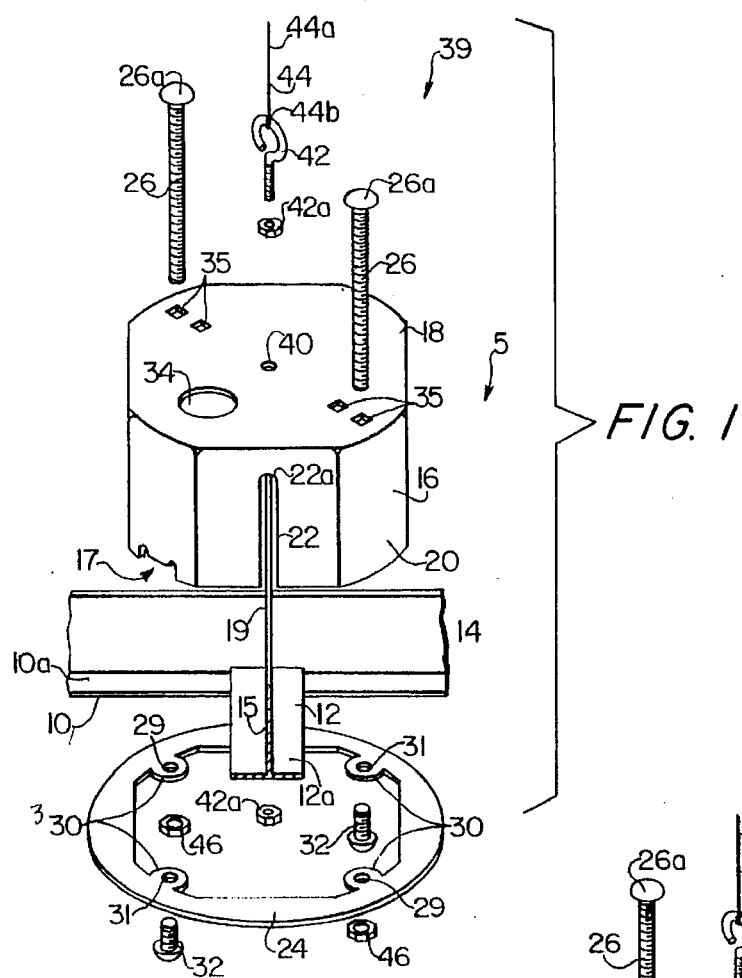
FIG. 1 illustrates an exploded view of a first embodiment of the inventive device.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
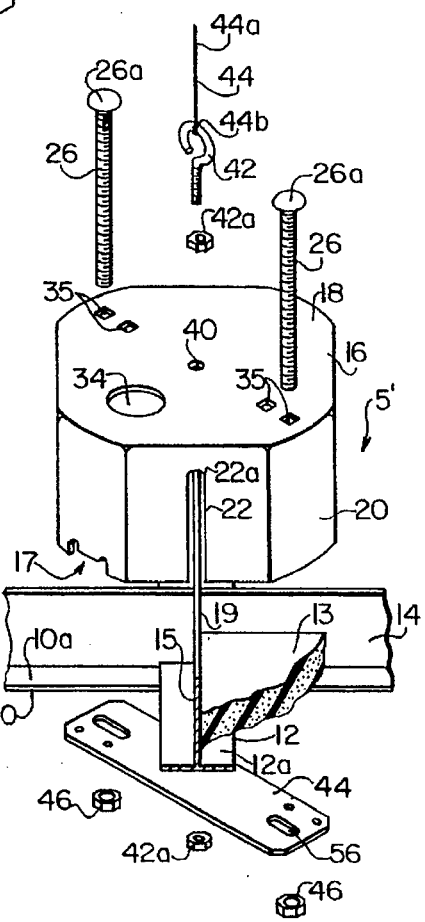
FIG. 2 illustrates an exploded view of a second embodiment of the device.

The present invention is directed to a fixture mounting device 5 for mounting a fixture to a "drop" or suspended ceiling that includes a plurality of elongated, spaced-apart, perpendicular supporting members secured together in a criss-cross arrangement and suspended from an overhead support structure. FIG. 1 shows a pair of criss-cross ceiling supporting members 10, 12 suspended from an overhead structure (not shown), and FIG. 2 shows a ceiling panel 13 supported by supporting members 10, 12 to form a drop or suspended ceiling. Vertical members 14, 15 extend vertically upwardly from upper faces 10a, 12a of supporting members 10, 12, respectively, and intersect at the point of intersection 19 of criss-cross supporting members 10, 12.

The invention provides a particularly strong, lightweight device 5 for hanging an electrical ceiling fixture, such as a chandelier, fan, or any other electrical ceiling fixture, from a suspended ceiling. Device 5 includes box 16, preferably a steel box, having a closed top 18, an open bottom 17, and a continuous sidewall 20. Four slots 22 are formed in side wall 20 at 90° intervals for engaging vertical members 14, 15 so that vertical members 14, 15 interfit with box 16.

As shown in FIG. 1, a plate 24 or similar device is attached to box 16 to secure box 16 to supporting members 10, 12 by means of fasteners 26, such as screws, bolts, or carriage bolts, inserted through non-circular holes 35 in box top 18 and corresponding holes 29 formed in inwardly-directed tongues 30 of plate 24 and secured by nuts 46. If desired, an "O"-ring may be placed over the threaded portion of carriage bolts 26 before they are inserted into plate 24.

Fasteners 26 also serve as fixture securing means for securing the fixture to box 16. Additionally, inwardly-directed tongues 30 or the like having holes 31 formed therein and configured to receive fasteners 32, such as machine screws, serve as supplemental fixture support means for providing a well-secured support to which the fixture can be mounted.

Electrical wires (not shown) can be inserted through aperture 34 in box top 18.

Box 16 is preferably provided with a plurality of radially extending holes 35 so that different types and sizes of fixtures may be attached to box 16.

The invention further provides suspension means 39 for securing box 16 to the overhead support structure (not shown). Suspension means 39 preferably includes a hole 40 formed in box top 18 and configured to receive a fastener 42, such as an eye bolt, and a wire or chain support 44 having an upper end 44a for securing wire support 44 to the overhead support structure (not shown) and a lower end 44b for securing wire support 44 to fastener 42. For example, upper end 44a of wire support 44 can be attached to a fastener, such as an eye bolt (not shown), that is attached to the overhead structure (not shown) and lower end 44b of wire support 44 can be attached to fastener 42, that is inserted through hole 40 and secured to box top 18 by nuts 42a. Thus, if the entire suspended ceiling should fall, box 16 and the fixture will remain suspended from the overhead support structure (not shown), thereby preventing the fixture from falling to the floor.

In an alternate embodiment shown in FIG. 2, device 5' includes a strap 44 secured to open bottom 17 of box 16.

Strap 44 extends diagonally across and underneath the point of intersection 19 of lightweight criss-cross ceiling supporting members 10, 12 and is attached to box 16 by inserting fasteners 26, such as screws, through non-circular holes 35 in box top 18 and through apertures 56 in strap 44 and securing fasteners 26 with nuts 46. The fixture is attached to box 16 by fasteners 26 inserted through apertures 56 of strap 44. Preferably, apertures 56 are elongated to accommodate different types of fixtures.

As shown in FIG. 3, upper ends 22a of slots 22 preferably include breakable tongues 51. Tongues 51 can be broken off to accommodate the height of vertical members 14, 15, if necessary. Thus, slots 22 are configured to receive at least two different heights of vertical members 14, 15, so that either plate 24 or strap 44 may be attached flush against open bottom 17 of box 16 under a point of intersection of criss-cross ceiling support members 10, 12.

Figure 7:
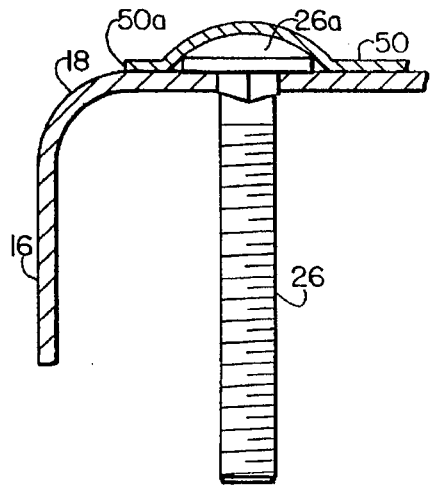
FIG. 7 illustrates a partial section of the box.

FIGS. 5, 6, and 7 illustrate a flat strap 50 having first and second indentations 52, 54 adjacent its first and second ends 50a, 50b, respectively. Indentations 52, 54 are configured to fit over heads 26a of fasteners 26 to prevent fasteners 26 from moving upwardly during attachment of a fixture to box 16. Strap 50 is held in place flush against box top 18 by inserting a fastener 42, such as an eye bolt, through hole 56 in strap 50 and through hole 40 in box top 18 and securing fastener 42 with nuts 42a.

This construction provides a reasonably simple and safe method and structure for attaching any kind of conventional ceiling fixture, such as a fan or a lighting fixture, to a suspended ceiling.

Modifications and variations of the above-described embodiments of the present invention are possible, as appreciated by those skilled in the art in light of the above teachings. For example, breakable tongues 51 can be formed as two or more breakable sections, to allow several possible slot heights.

It is therefore to be understood that, within the scope of the appended claims and their equivalents, the invention may be practiced otherwise than as specifically described.

What is claimed is:

1. An electric fixture hanging device for hanging an electric fixture from a suspended ceiling supported by an overhead structure, said electric fixture hanging device comprising:

a box having a closed top, an open bottom, and a continuous side wall having a first height;

said side wall having four slots formed therein at 90 degree intervals for engagement with the suspended ceiling and said slots extending inwardly from said open bottom such that said slots extend inwardly from said open bottom by a second height that is less than said first height and wherein said slots have closed upper portions extending upwardly toward said box top, with breakable tongues removably attached to said upper portions of said slots for varying said slot height; and fixture fasteners for connecting the electric fixture to said box, wherein said fixture fasteners extend from said box top in the direction of said box bottom and are of sufficiently greater length than said first height such that distal ends of said fixture fasteners form connecting means for connecting the fixture to said box.

2. The device of claim 1, further comprising a suspension fastener connected to said box top, with said suspension fastener having means for securely connecting said suspension fastener to the overhead structure.

3. The device of claim 1, wherein said box top includes a plurality of non-circular holes therethrough at spaced locations and wherein said fixture fasteners extend through said non-circular holes with said non-circular holes limiting the possible rotational movement of said fixture fasteners and with the spaced locations of said non-circular holes providing means for connecting different fixture types to said box.

4. The device of claim 3, wherein said fixture fasteners have top ends and said device further including a strap extending across said box top and over said top ends of said fixture fasteners with said strap having indentations for engagement with said top ends of said fixture fasteners and for limiting the possible axial movement of said fixture fasteners.

5. The device of claim 1, further including a plate secured across said open bottom of said box with said plate providing means for securing said box to the suspended ceiling.

6. The device of claim 5, wherein said plate includes an inwardly extending tongue having a hole therethrough, and one of said fixture fasteners extends through said hole in said tongue with said distal end of said fixture fastener extending below said plate and forming said connecting means.

* * * * *